United States Patent [19]

Matsumoto et al.

[11] Patent Number: 4,879,759
[45] Date of Patent: Nov. 7, 1989

[54] HOLDING STRUCTURE FOR A PAGING RECEIVER HAVING EXTRA FUNCTIONS

[75] Inventors: Takeshi Matsumoto; Takashi Oyamada; Sigeki Hayasaka, all of Tokyo, Japan

[73] Assignee: NEC Corporation, Tokyo, Japan

[21] Appl. No.: 141,747

[22] Filed: Jan. 11, 1988

[30] Foreign Application Priority Data

Jan. 8, 1987 [JP] Japan ................................ 62-1580[U]
Jan. 26, 1987 [JP] Japan ............................. 62-10336[U]
Aug. 28, 1987 [JP] Japan ................................ 62-131782

[51] Int. Cl.4 ................................................. H04B 1/08
[52] U.S. Cl. ..................................... 455/348; 455/351; 361/399; 361/422
[58] Field of Search ............... 455/347, 348, 344, 351, 455/345, 346, 349, 89, 90; 340/825.44; 361/399, 395, 422

[56] References Cited

U.S. PATENT DOCUMENTS

| 4,325,142 | 4/1982 | Nakazawa | 455/351 |
| 4,536,925 | 8/1985 | Boothe et al. | 455/351 |
| 4,641,370 | 2/1987 | Oyamada et al. | 455/348 |
| 4,653,115 | 3/1987 | Holcomb | 455/348 |
| 4,704,740 | 11/1987 | McKee et al. | 455/351 |
| 4,754,528 | 7/1988 | Lyons et al. | 455/351 |

Primary Examiner—Robert L. Griffin
Assistant Examiner—Curtis Kuntz
Attorney, Agent, or Firm—Sughrue, Mion, Zinn, Macpeak & Seas

[57] ABSTRACT

A paging receiver to which various extra functions may be selectively added. A receiver body of the paging receiver has a miniature and thin configuration and is provided with only a sound type alerting function. Minimum necessary degrees of receiving function, antenna function, speaker function and power psupply function are furnished with in the receiver body. A holder adapted to hold the receiver body is provided with advanced functions a well as a vibrator function and other extra functions. Only when the holder is combined with the receiver body, it allows the receiver to exhibit the advanced functions or the extra functions as desired. In order that the receiver body and the holder may be fixed to each other when combined, a housing of the receiver body and the holder are individually provided with mating portions and electrical connecting terminals.

21 Claims, 5 Drawing Sheets

Fig. 1A
PRIOR ART
Fig. 1B
PRIOR ART
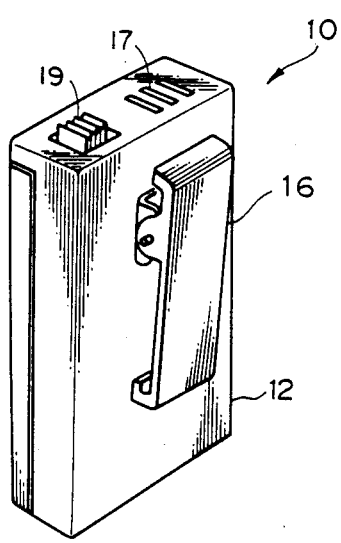
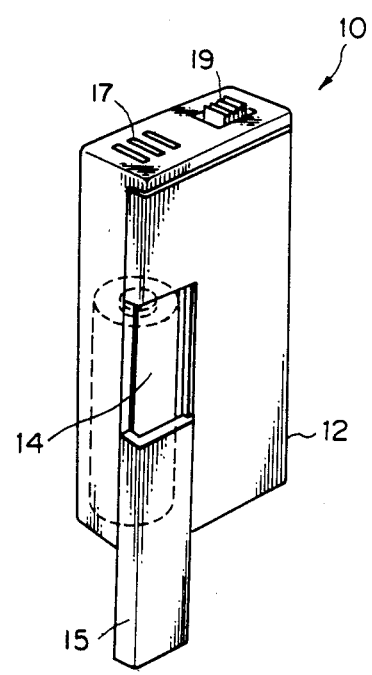

Fig. 3A
Fig. 3B
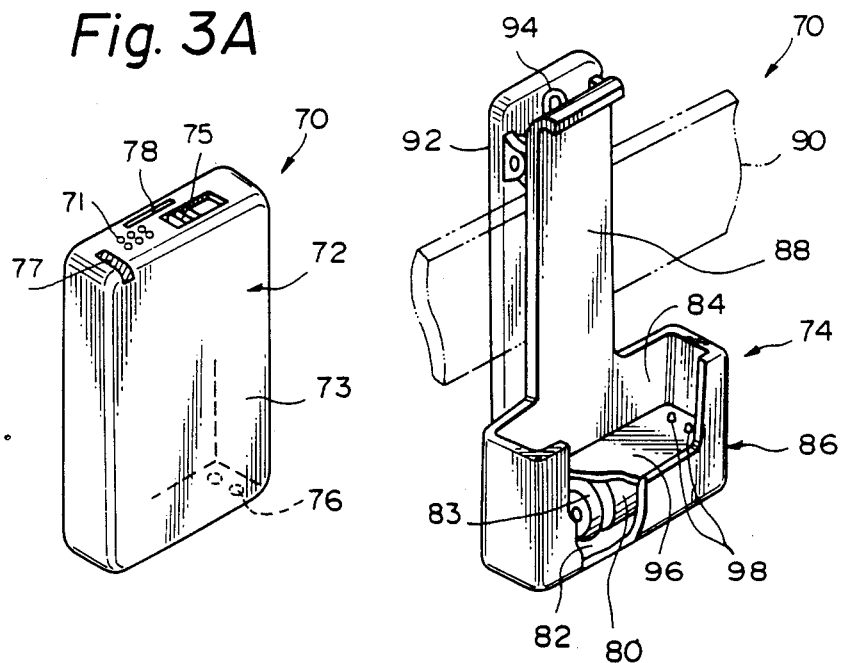
Fig. 3C
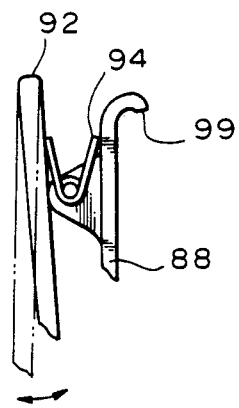

HOLDING STRUCTURE FOR A PAGING RECEIVER HAVING EXTRA FUNCTIONS

BACKGROUND OF THE INVENTION

The present invention relates to a paging receiver and, more particularly, to a holding structure for a paging receiver to which more advanced functions than those originally furnished with in the receiver or a vibrator function, display function and other extra functions can be added with ease.

A paging receiver of the type described is disclosed in, for example, U.S. Pat. No. 4,641,370. The paging receiver disclosed includes a base plate or base container which closes the bottom open end of the receiver housing. The base container accommodates extra parts, such as a vibrator which alerts a person to a call by vibration and not by sound, with no regard to the application. Nevertheless, it is not easy for the receiver to attach or detach the base plate or container to or from the receiver body, because the base plate and container and furnished with a battery container which is electrically and mechanically connected to a printed circuit board within the receiver body by solder.

A miniature and thin paging receiver which is powered by a button type battery of small capacity is now under development. However, a paging receiver having various functions and, yet, a miniature and thin configuration cannot be implemented without imposing limitations on the reception sensitivity, vibrator function and others. The battery having a small capacity has to be frequently replaced with another because it is shared by the various functions as stated above. In addition, when such a paging receiver is put in a pocket or in a pocketbook, its switches cannot be manipulated with ease due to the miniature and thin construction.

SUMMARY OF THE INVENTION

It is, therefore, an object of the present invention to provide a holding structure for a paging receiver with extra functions which is easy to carry and can be used in a particular configuration depending upon the circumstances.

It is another object of the present invention to provide a holding structure for a paging receiver with extra functions which is miniature, light weight, and manipulable with ease.

It is another object of the present invention to provide a holding structure for a paging receiver with extra functions which is efficiently producible and easily controllable in production.

It is another object of the present invention to provide a holding structure for a paging receiver to which a vibrator function for annunciating the reception of a call by vibration can be added as desired.

A device for holding a portable receiver and selectively adding a plurality of extra functions to the receiver of the present invention comprises a receiver housing accommodating a body portion of the receiver, and a holder for removably holding the receiver housing and adding at least one of the extra function to the receiver.

In accordance with the present invention, a paging receiver to which various extra functions may be selectively added is disclosed. A receiver body of the paging receiver has a miniature and thin configuration and is provided with only a sound type alerting function. Minimum necessary degrees of receiving function, antenna function, speaker function and power supply function are furnished with in the receiver body. A holder adapted to hold the receiver body is provided with advanced functions as well as a vibrator function and other extra functions. Only when the holder is combined with the receiver body, it allows the receiver to exhibit the advanced functions or the extra functions as desired. In order that the receiver body and the holder may be fixed to each other when combined, a housing of the receiver body and the holder are individually provided with mating portions and electrical connecting terminals.

BRIEF DESCRIPTION OF THE DRAWINGS

The above and other objects, features and advantages of the present invention will become more apparent from the following detailed description taken with the accompanying drawings in which:

FIGS. 1A to 1D are views showng a prior art paging receiver;

FIGS. 3A to 3C are views showing another embodiment of the holding structure in accordance with the present invention; and FIGS. 4A and 3B are views showing a further embodiment of the holding structure in accordance with the present invention.

DESCRIPTION OF THE PREFERRED EMBODIMENTS

Figure 1C:
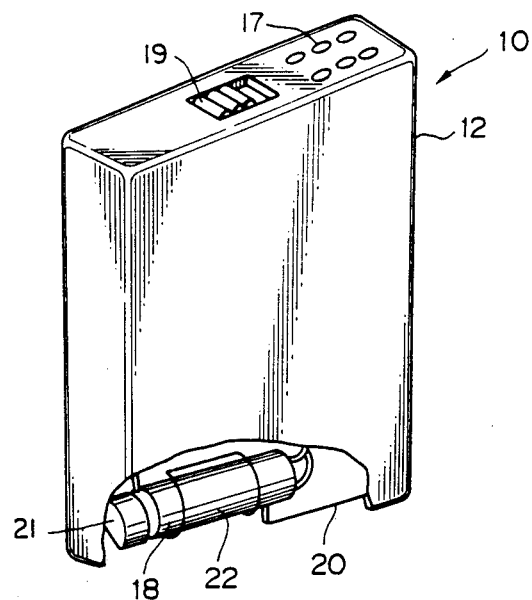

To better understand the present invention, a brief reference will be made to a prior art paging receiver, shown in FIGS. 1A to 1D. As shown, the prior art paging receiver, generally 10, includes a housing 12 in which a receiver body, not shown, and a battery 14 for powering the receiver body are accommodated.

A battery cover 15 is positioned at the back of the housing 12. The receiver body is made up of a receiver section, an antenna section, a speaker section, etc. A butterfly type belt clip 16 is fitted on the back of the housing 1 to allow the receiver 10 to be put on the user's waist belt.

The top of the housing 12 is formed with holes 17 through which sound from a loudspeaker (not shown) passes, and provided with a reset switch 19.

Figure 1D:
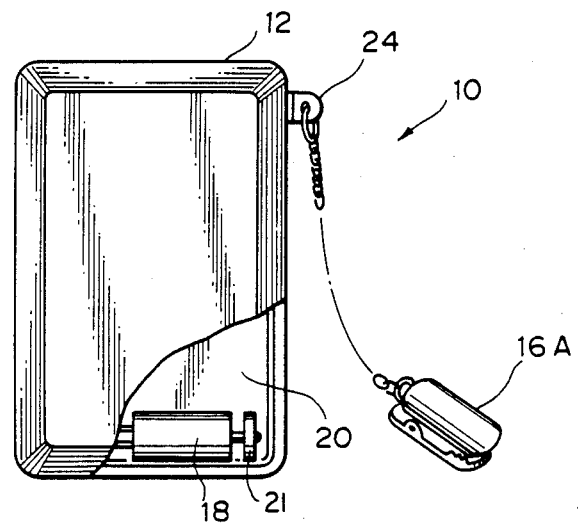

The housing 12 is provided with substantial dimensions so that it may accommodate a receiver section having the highest possible sensitivity, a highly sensitive antenna section, a high performance speaker section, a large capacity power source section, and various extra functions such as a vibrator function which is implemented with a vibrator and a motor for driving the vibrator. For example, as shown in FIG. 1C, the size of the housing 12 is such that, when the vibrator function is desired, a motor 18 and a vibrator element 26 which serve as a drive source can be fixed by a metal fixture 22 to a printed circuit board 20 of the receiver body, which is nested in the housing 12. In FIG. 1D, the belt clip 16 is replaced with a clip 16A with a chain which allows the receiver 10 to be put in the user's pocket or a bag. The clip 16A is provided with an alligator configuration to be thereby prevented from slipping off the pocket or the bag.

As previously discussed, even in those applications which do not need the vibrator and other various extra functions, extremely high sensitivity, and others, one has to carry such a bulky receiver all the time. This is undesirable for a paging receiver of the type concerned the priority condition of which is the miniature and light weight construction. While an exclusive smaller housing for such particular applications may be prepared, it cannot serve the other applications.

Figure 2A:
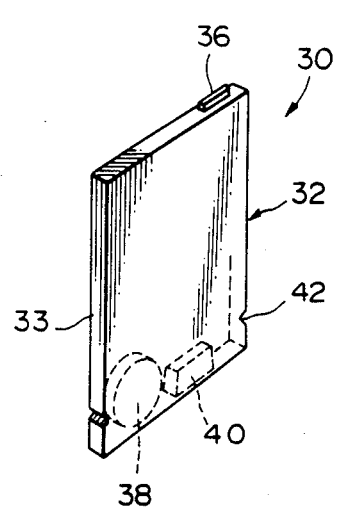
FIGS. 2A to 2D are views showing a holding structure for a paging receiver with extra functions embodying the present invention.
Figure 2B:
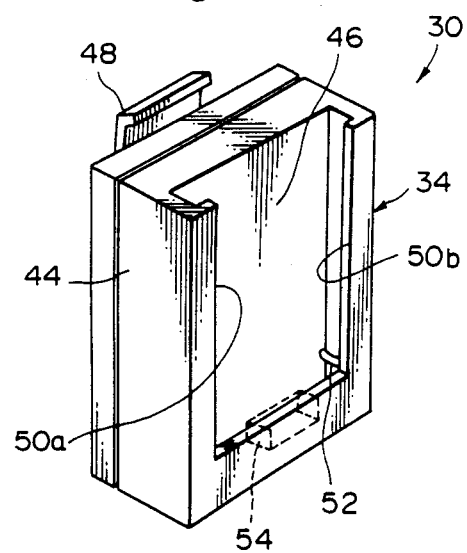

Referring to FIGS. 2A to 2D, a holding structure for a paging receiver embodying the present invention is shown. As shown in FIGS. 2A and 2B, the paging receiver 30 is generally constituted by a miniature and thin receiver body 32, and a holder 34 which serves to contain and hold the receiver body 32 while accommodating extra functions. The receiver body 32 includes a housing 33 in which at least an antenna, a receiver section connected to the antenna for the reception of a call, and a speaker for alerting a person to a call by sound are built in, although not shown in the figures. An operating section 36 is provided on the receiver body 32 to be accessible for turning on and off a power switch of the receiver section, resetting the alerting sound, and other purposes. A button type battery 38 is adapted to power the receiver section and speaker. A female socket 40 allows, for example, a device having a vibrator function to be connected to the receiver 30. The reference numeral 42 designates a notch which is formed on a side wall of a lower portion of the housing 33. As shown in FIG. 2B, the holder 34 is made up of a support member 44 having a space 46 for receiving the receiver body 32, and a belt clip 48 for putting the support member 44 on the user's waist belt or the like. The support member 44 includes guide portions 50a and 50b for guiding the receiver body 32 while the latter is inserted in the space 46, the guide portions 50a and 50b each having a generally L-shaped cross-section. At least one of the guide portions 50a and 50b is provided with a projection 52 which mates with the notch 42 of the receiver body 32 for fixing the receiver body 32 in place within the space 46. The support member 44 further includes a plug (male) 54 having a connecting terminal 54a (see FIGS. 2C and 2D)

which is electrically connectable to the socket 40 of the receiver body 32.

Figure 2C:
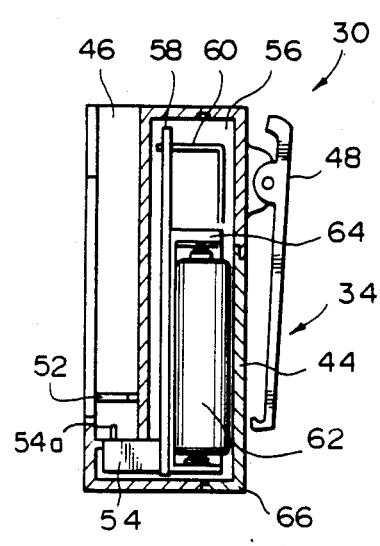

The holder 34 is shown in detail in FIG. 2C. Specifically, the support member 44 has another space 56 therein for receiving a printed circuit board 58. Fitted on the printed circuit board 58 are various optional elements, i.e., a high sensitivity antenna 60, a large capacity battery 62, a battery holder 64 with a positive terminal 64c and a negative terminal 64b, and a high sensitivity receiver section, not shown. A battery cover 66 which is openable for replacing the battery 62 is mounted to the support member 44. As stated, the holder 34 itself serves as an extra function unit with the high sensitivity receiver section and antenna section and the large capacity power source section optionally added thereto which are independent of the usual receiver section, antenna section and power source of the receiver body 32.

Figure 2D:
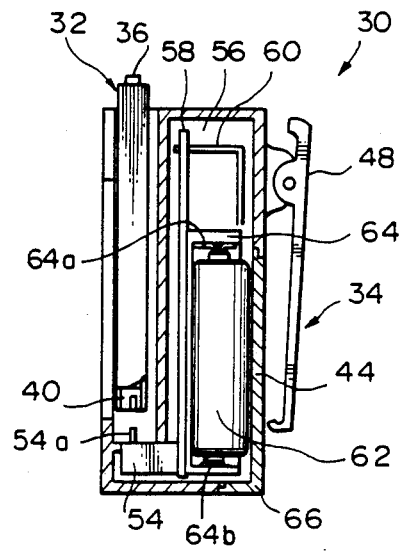

Each of the support member 44 of the holder 34 and the housing 33 of the receiver body 32 is usually implemented with a molding of plastics and, therefore, has some degree of elasticity. Hence, when the receiver body 32 is inserted in the space 46 of the holder 34, the notch 42 mates with the projection 52 resulting that the receiver body 32 is fixed to the holder 34 by certain strength. As shown in FIG. 2D, when the receiver body 32 is mounted in the space 46 of the holder 34 guided by the guides 50a and 50b, the socket 40 is connected to the plug (male) 54 while, at the same time, the notch 42 is mated with the lug 52 to fix the receiver body 32 in place.

In this particular embodiment, when it is desired to add other extra functions such as a vibrator function and display function to the receiver 30, the second space 56 of the holder 34 may be modified in configuration with or without the number of pins of the connector of the plug 54 suitably changed.

Referring to FIGS. 3A to 3C, another embodiment of the holding structure in accordance with the present invention is shown in which a vibrator function is added as an extra function. As shown, the paging receiver 70 is constituted by a miniature and thin receiver body 72 having a sound type alerting function, FIG. 3A, and a holder 74 for accommodating the receiver body 72, FIG. 3B. The receiver body 72 is formed with first connecting terminals 76 through the bottom of its housing 73, and a slit 78 through the top of the housing 73.

The top of the housing 73 is formed with holes 71 through which sound from a loudspeaker (not shown) passes and provided with a reset switch 75 and a lamp 77.

The slit 78 is engageable with the holder 74 as will be described. The holder 74 includes a generally rectangular parallelepiped box section 86, and a support plate section 88. In the box section 86, while a space 82 for accommodating a motor 80 and a vibrator element 83 adapted to generate vibration, i.e., a vibrator function is defined in a lower portion, a space 84 for receiving the housing 73 of the receiver body 72 is defined in an upper portion. The support plate section 88 serves to hold the housing 73 of the receiver body 72 more firmly in the space 84. The box section 86 and the support plate section are molded integrally with each other by using plastics or the like. A butterfly type belt clip 92 is mounted on the back of the holder 74 through a coil spring 94 so that the receiver 70 may be put on, for example, the user's waist belt 90. A partition 96 of the box section 86 which isolates the spaces 82 and 84 from each other is provided with second connecting terminals 98 which are connectable to the first terminals 76 of the receiver body 72. In this configuration, signals and power for driving the motor 80 are fed from the receiver body 72 to the motor 80 via the terminals 76 and 98. The support plate section 88 terminates at a lug 99 (FIG. 3C) which is adapted to mate with the slit 78 of the receiver body 72.

To fix the receiver body 72 to the holder 74, the lower part of the housing 73 of the receiver body 72 is inserted in the space 84 of the holder 74 to interconnect the first and second terminals 76 and 98 and, then, the slit 78 is mated with the lug 99. In this condition, the receiver body 72 is firmly supported by the holder 74.

Figure 4A:
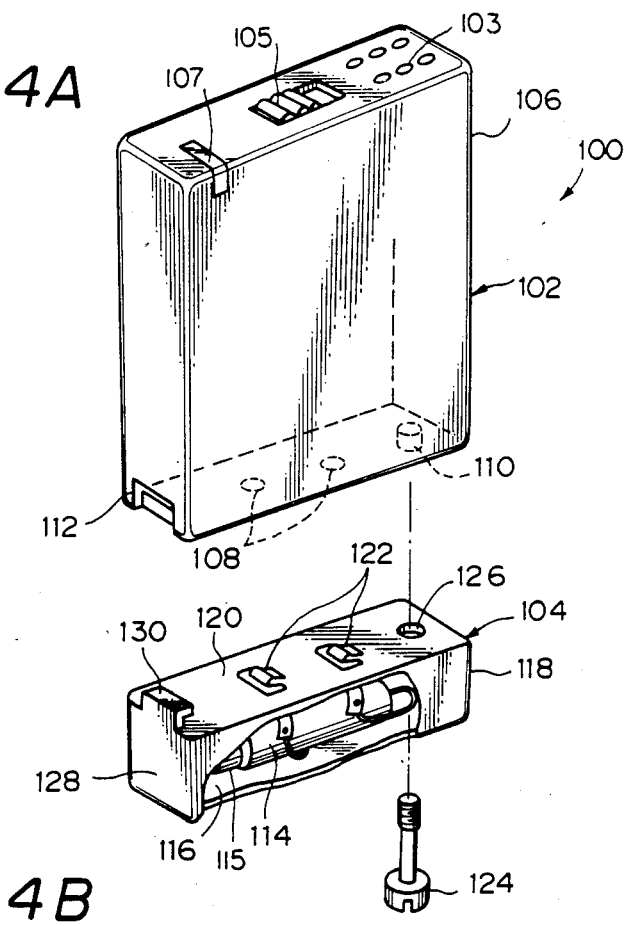
Figure 4B:
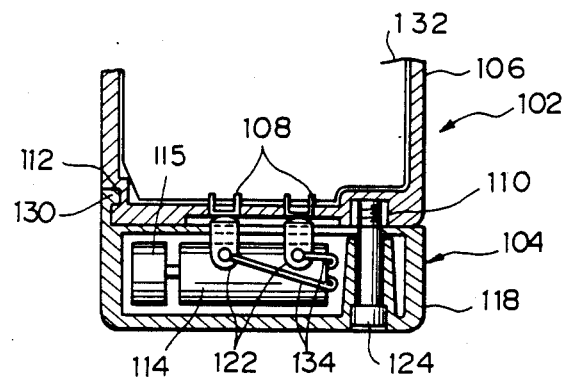

Referring to FIGS. 4A and 4B, a further embodiment of the holding structure in accordance with the present invention is shown. In this embodiment, too, the vibrator function is used for an extra function. As shown, the paging receiver 100 comprises a receiver body 102 and a container 104 connected to the receiver body 102 for adding the vibrator function thereto. The receiver body 102 includes a housing 106 having a capacity which accommodates a receiver having a sounding function only and, as in the foregoing embodiments, it has a small and thin configuration. The housing 106 is provided with first connecting terminals 108 for feeding signals and power to the container 104, and a female screw 110. The housing 106 is further provided with a recess 112 at the lower end of its side wall.

The top of the housing 106 is formed with holes 103 through which sound from a loudspeaker (not shown) passes and provided with a reset switch 105 and a lamp 107.

On the other hand, the container 104 comprises a box-like housing 118 in which a space 116 is defined for accommodating a motor 114 and a vibrator element 115, which implements the vibrator function. The top 120 of the housing 118 is configured substantially in the same manner as the bottom of the housing 106 of the receiver body 102. Specifically, the top 120 which is to make contact with the receiver body 102 is provided with second connecting terminals 122 connectable with the first terminals 108 of the receiver body 102, and a hole 126 through which a male screw 124 may be driven into the female screw 110. A hook-like pawl 130 extends from a side wall 128 of the housing 118 which adjoins the top 120, the pawl 130 being adapted to mate with the recess 112. To fix the receiver body 102 to the container 104, the recess 112 is mated with the pawl 130, and the female screw 110 is engaged with the male screw 124.

FIG. 4B is a fragmentary section of the structure of FIG. 4A. showing the receiver body 102 fixed to the container 104. The first connecting terminals 108 of the housing 106 are soldered or otherwise fixed to a printed circuit board 132 which is built in the housing 106. The second connecting terminals 122 of the housing 118 are connected to the motor 114 by leads 134. The female screw 110 engageable with the male screw 124 is provided in the bottom of the housing 106 by insersion molding or like technique. When it is desired to add the vibrator function to the receiver 100, all that is required is mating the pawl 130 of the container 104 in which the motor 114 is received with the recess 112 of the receiver housing 106 and, then, driving the male screw 124 into the female screw 110.

In summary, in accordance with the present invention, when it is not needed to furnish a paging receiver with an extra function or with extra sensitivity, a miniature and thin receiver body only may be carried in a pocket or the like while, when it is needed to furnish it with such a function, an integral receiver and holder assembly may be carried on a waist belt or the like. This promotes convenient use of a paging receiver for any particular application while enhancing efficient manipulation.

The combination of a receiver body and a holder which has a motor therein allows a vibrator function to be easily added as needed. Hence, the receiver remains minimum in size when its sounding function only is desired and may readily be provided with a vibrator function by use of the holder. Further, a person can easily add and remove the vibrator function, i.e., attach and detach the container with a vibrator function simply by manipulating a screw. When it comes to production, on the other hand, it is not necessary to mount motors in some receivers and not in others as demanded by customers and, therefore, the production control is easy. All that is required is producing holders with a vibrator function independently of receiver bodies and delivering them as optional units.

Various modifications will become possible for those skilled in the art after receiving the teachings of the present disclosure without departing from the scope thereof.

What is claimed is:

1. A holding structure for holding a paging receiver comprising:

receiver housing means accommodating a thin body portion of said receiver which is made up of at least a receiver section, an antenna section, speaker section and a battery section; and extra function adding means electrically and mechanically connectable to said body portion of said receiver for selectively adding a plurality of extra functions to said paging receiver;

said receiver housing means comprising a housing member, a first electrical connecting member provided in said housing member and first locking means provided in said housing member;

said extra function adding means comprising a support member, a second electrical connecting member connectable to said first connecting member, second locking means engageable with said first locking means, and guide members for individually guiding opposite side walls of said housing member when said body of said receiver is connected to said extra function adding means.

2. A holding structure as claimed in claim 1, wherein said housing member comprises a rectangular parallelepiped box in which said receiver section, antenna section, speaker section and battery section are accommodated.

3. A holding structure as claimed in claim 1, wherein said support member of said extra function adding means includes a first portion for receiving and holding said housing member and a second portion for accommodating means which implements said extra functions.

4. A holding structure as claimed in claim 1, wherein said first locking means comprises a notch provided in at least one of said opposite side walls of said housing member, and said second locking means comprises a projection provided on an inner side wall of said first portion of said support member.

5. A holding structure as claimed in claim 4 wherein said first connecting member comprises a socket provided in a bottom wall of said housing member, and second connecting member comprises a plug provided in an inner bottom wall of said first portion of said support member.

6. A holding structure as claimed in claim 1, wherein said extra function adding means further comprises clip means fitted on outer periphery of said support member which is opposite to said first portion of said support member.

7. A holding structure for holding a paging receiver comprising:

receiver housing means accommodating a body portion of said receiver which is made up of at least a receiver section, an antenna section, speaker section and a battery section; and extra function adding means electrically and mechanically connectable to said body portion of said receiver for selectively adding a plurality of extra functions to said receiver;

said receiver housing means comprising a housing member, a first electrical connecting member provided in said housing member and first locking means provided in said housing member;

said extra function adding means comprising a second electrical connecting member connectable to said first connecting member, second locking means engageable with said first locking means, and an open-top receiving portion for receiving said housing member.

8. Holding structure as claimed in claim 7, wherein said extra function adding means further comprises a support portion for supporting said housing member which is received in said receiving portion.

9. A holding structure as claimed in claim 7, wherein said extra function adding means further comprises a partition which isolates a first space for accommodating said housing member and a second space for accommodating means which implements said extra functions.

10. A holding structure as claimed in claim 9, wherein said support portion comprises a support plate which is formed integrally with said receiving portion to extend upward from said receiving portion.

11. A holding structure as claimed in claim 10, wherein said first locking means comprises a slit formed through an upper wall of said housing member, and said second locking means comprises a lug extending from an upper end of said support plate.

12. A holding structure as claimed in claim 11, wherein said first connecting member comprises a connecting terminal fitted in a bottom wall of said housing member, and said second connecting member comprises a connecting terminal fitted in said partition.

13. A holding structure as claimed in claim 12, wherein said extra function adding means further comprises clip means mounted on the back of said support plate.

14. A hold structure as claimed in claim 9 wherein said means for implementing said extra functions comprises a drive motor and a vibrator element for generating vibration.

15. A holding structure for holding a paging receiver comprising:
receiver housing means accommodating a body portion of said receiver which is made up of at least a receiver section, an antenna section, speaker section and battery section; and
extra function adding means electrically and mechanically connectable to said body portion of said receiver for selectively adding a plurality of extra functions to said receiver;
said receiver housing means comprising a housing member, a first electrical connecting member provided in said housing member and first and second locking means provided in said housing member;
said extra function adding means comprising a second electrical connecting member connectable to said first connecting member, and third and fourth locking means engageable with said first and second locking means, respectively.

16. A holding structure as claimed in claim 15, wherein said extra function adding means comprises a box-like holding member having a space defined therein and connectable to a bottom wall of said housing member.

17. A holding structure as claimed in claim 16, wherein said holding member comprises an upper wall which is engageable with said bottom wall of said housing member.

18. A holding structure as claimed in claim 17, wherein said first locking means comprises a recess provided in at least one of opposite side walls of said housing member, said second locking means comprises a female screw provided in a bottom wall of said housing member, said third locking means comprises a hook-like pawl extending from a side wall of said holding member which adjoins said upper wall, and said fourth locking means comprises a male screw which is passed through a hole of said upper wall of said holding member into threaded engagement with said female screw.

19. A holding structure as claimed in claim 18, wherein said first connecting member comprises a connecting terminal fitted in a bottom wall of said housing member, and second connecting member comprises a connecting terminal fitted in said upper wall of said holding member.

20. A holding structure as claimed in claim 19, wherein said space of said holding member accommodates means for implementing said extra functions.

21. A holding structure as claimed in claim 20, wherein said means for implementing said extra functions comprises a drive motor and a vibrator element for generating vibration.

* * * * *

UNITED STATES PATENT AND TRADEMARK OFFICE
CERTIFICATE OF CORRECTION

PATENT NO. : 4,879,759

DATED : November 7, 1989

INVENTOR(S) : Matsumoto et al

It is certified that error appears in the above-identified patent and that said Letters Patent is hereby corrected as shown below:

Title page:

Astract, line 6, delete "psupply" and insert --supply--.

Column 3, line 53, delete "64C" and insert --64a--.

Signed and Sealed this

Twenty-second Day of January, 1991

Attest:

HARRY F. MANBECK, JR.

Attesting Officer

Commissioner of Patents and Trademarks